Jan. 21, 1941. J. B. BUBB 2,229,274
MACHINE FOR FORMING BUCKET PINS
Filed Feb. 19, 1938 6 Sheets-Sheet 3
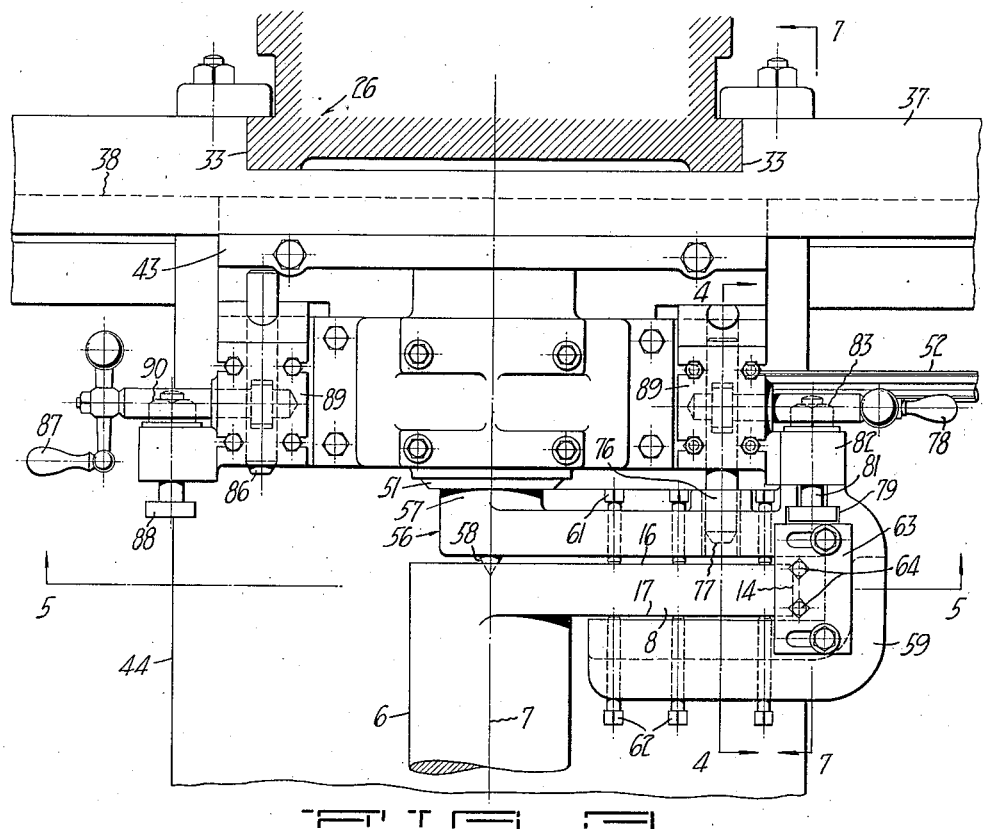
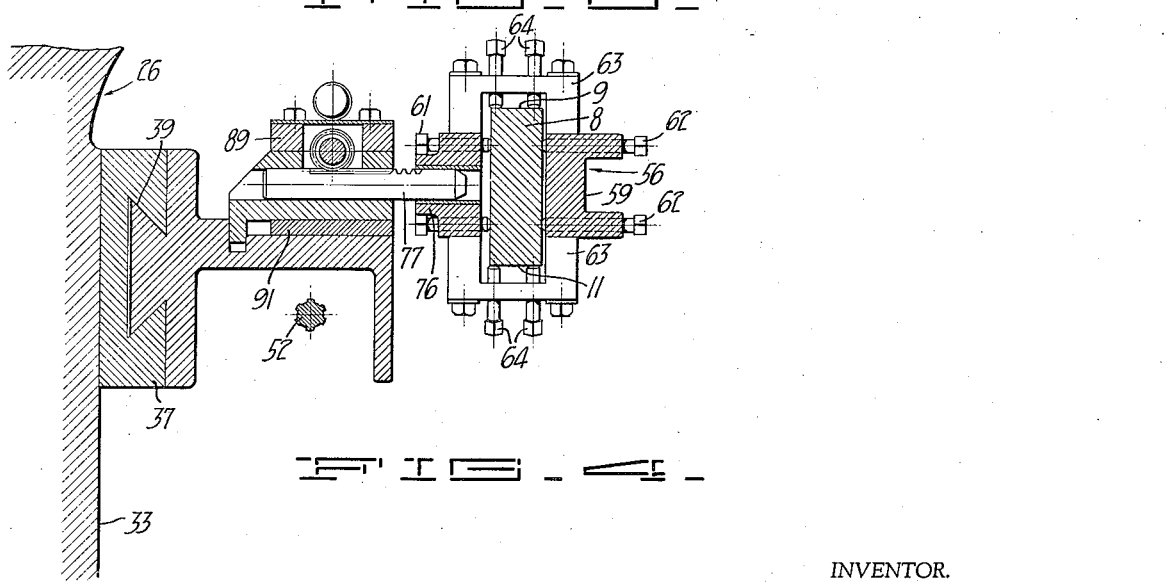
INVENTOR.
John B. Bubb
BY
ATTORNEY.

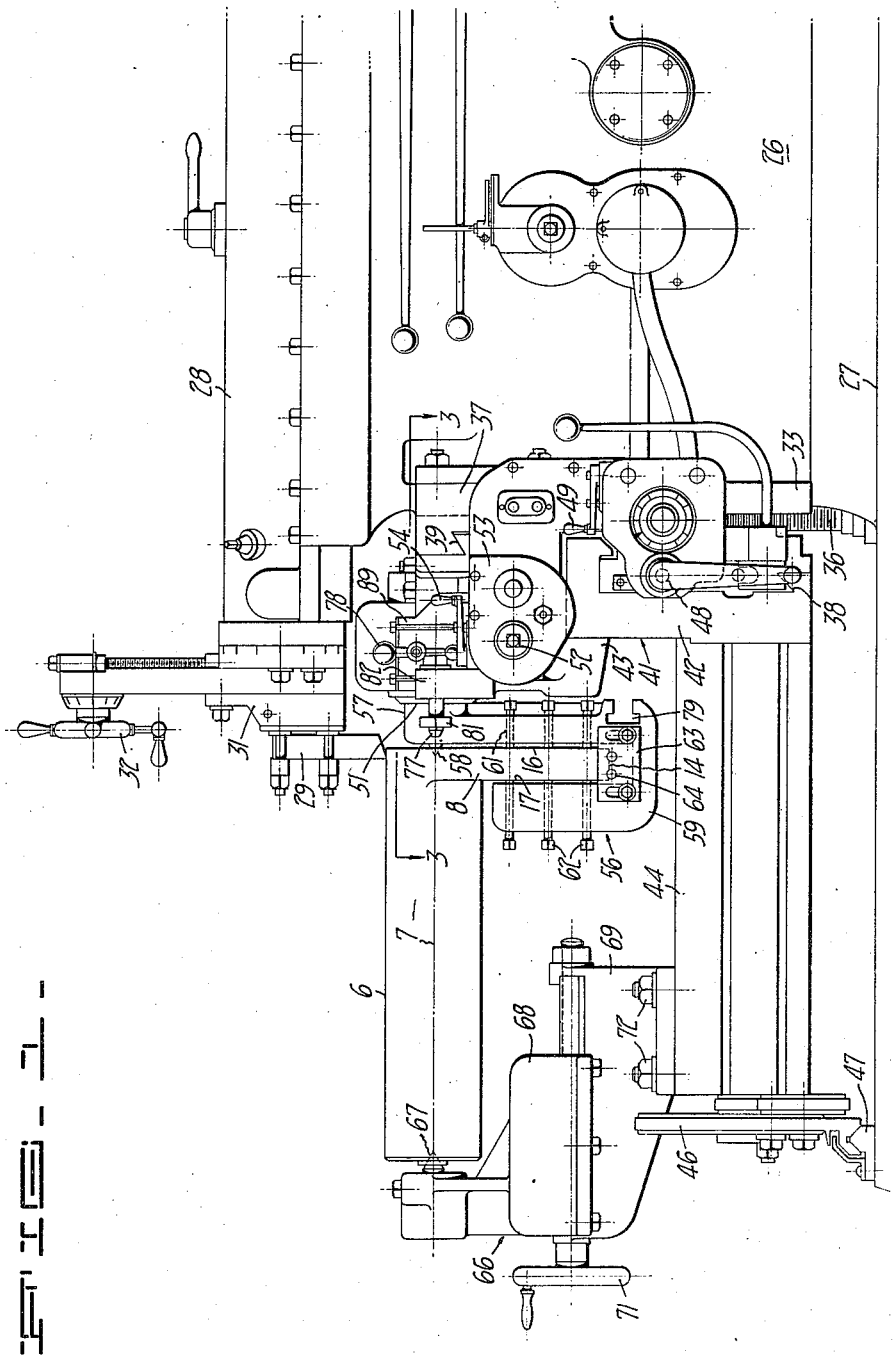

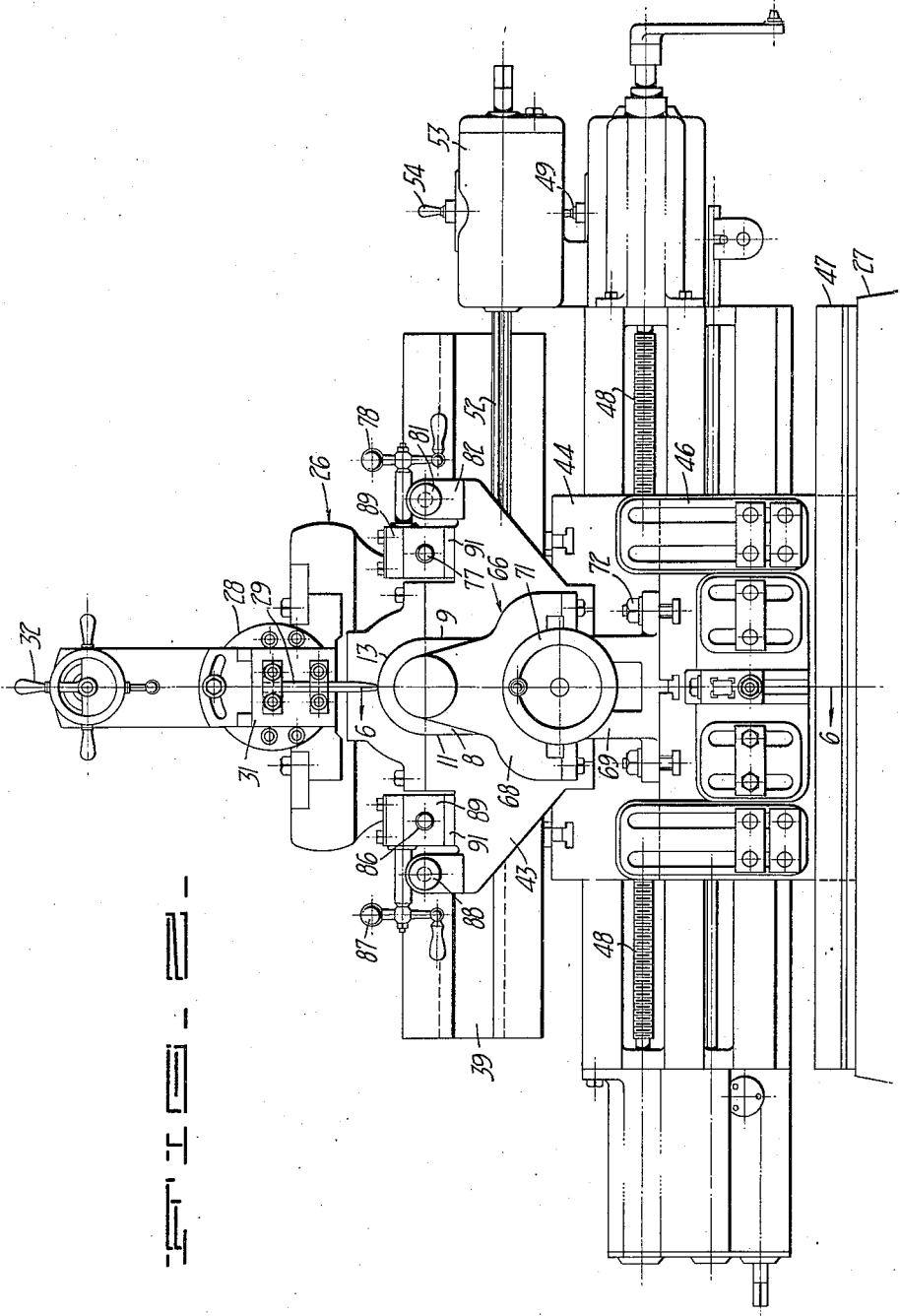

Jan. 21, 1941.  J. B. BUBB  2,229,274
MACHINE FOR FORMING BUCKET PINS
Filed Feb. 19, 1938  6 Sheets-Sheet 4
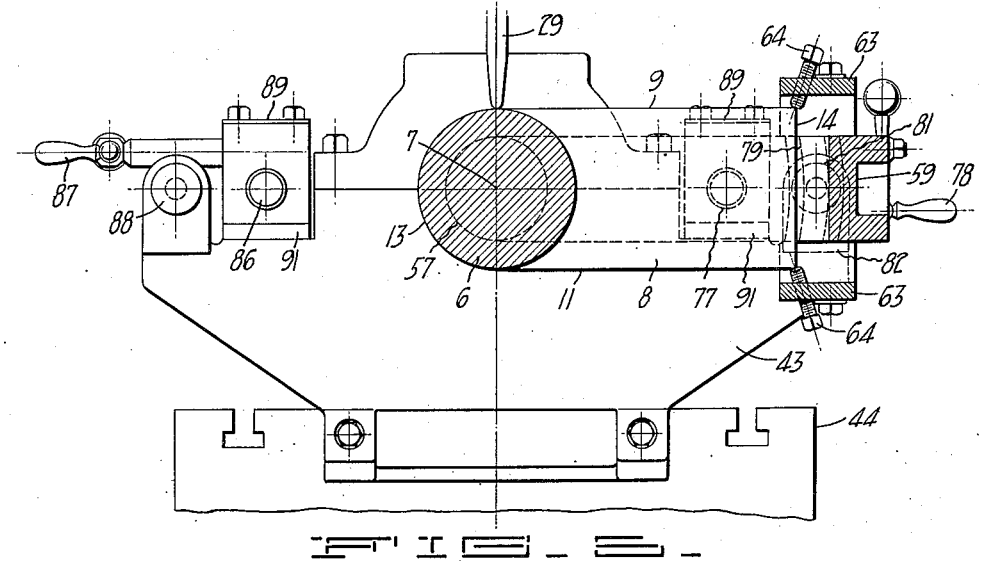
FIG_5_
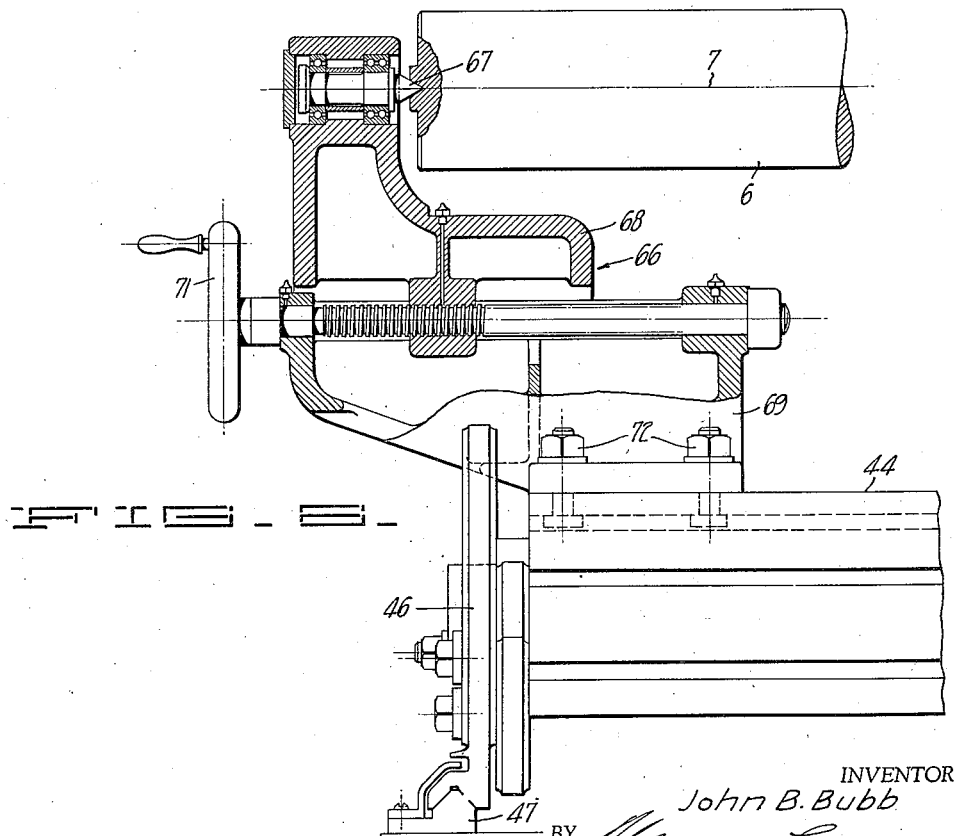
FIG_6_
INVENTOR.
John B. Bubb
BY
ATTORNEY.

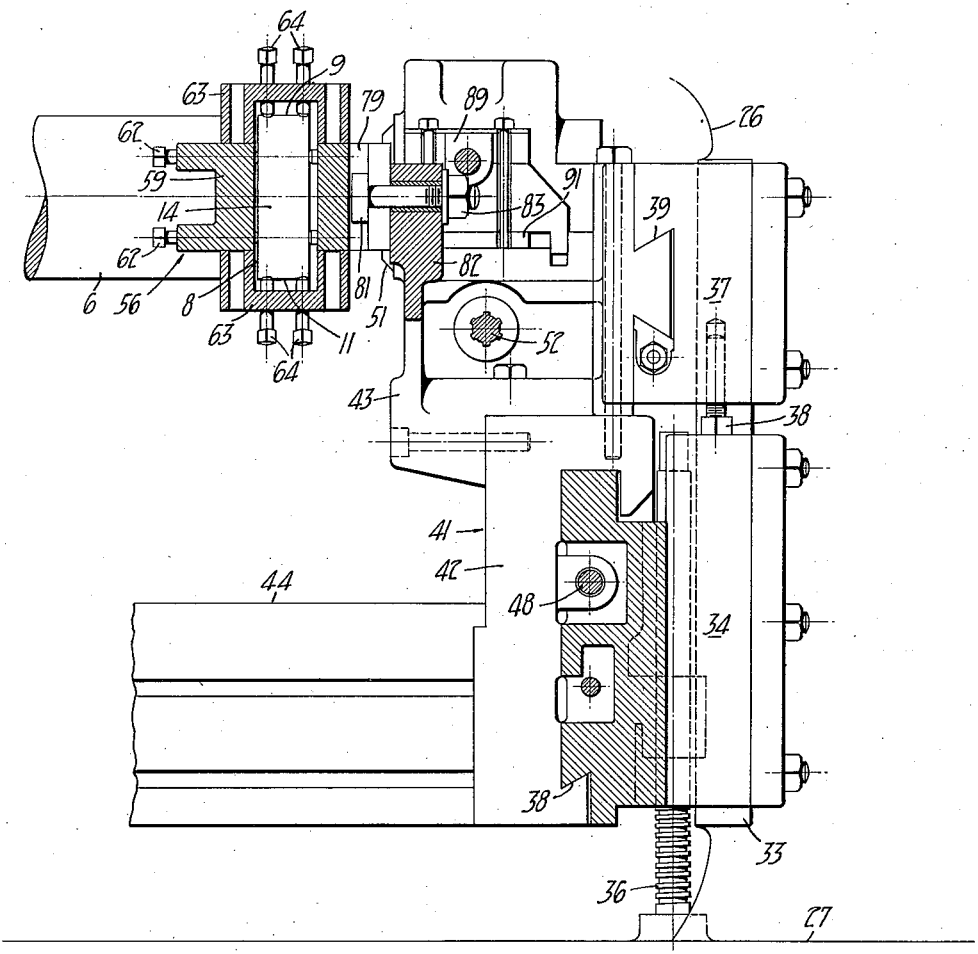
FIG_7

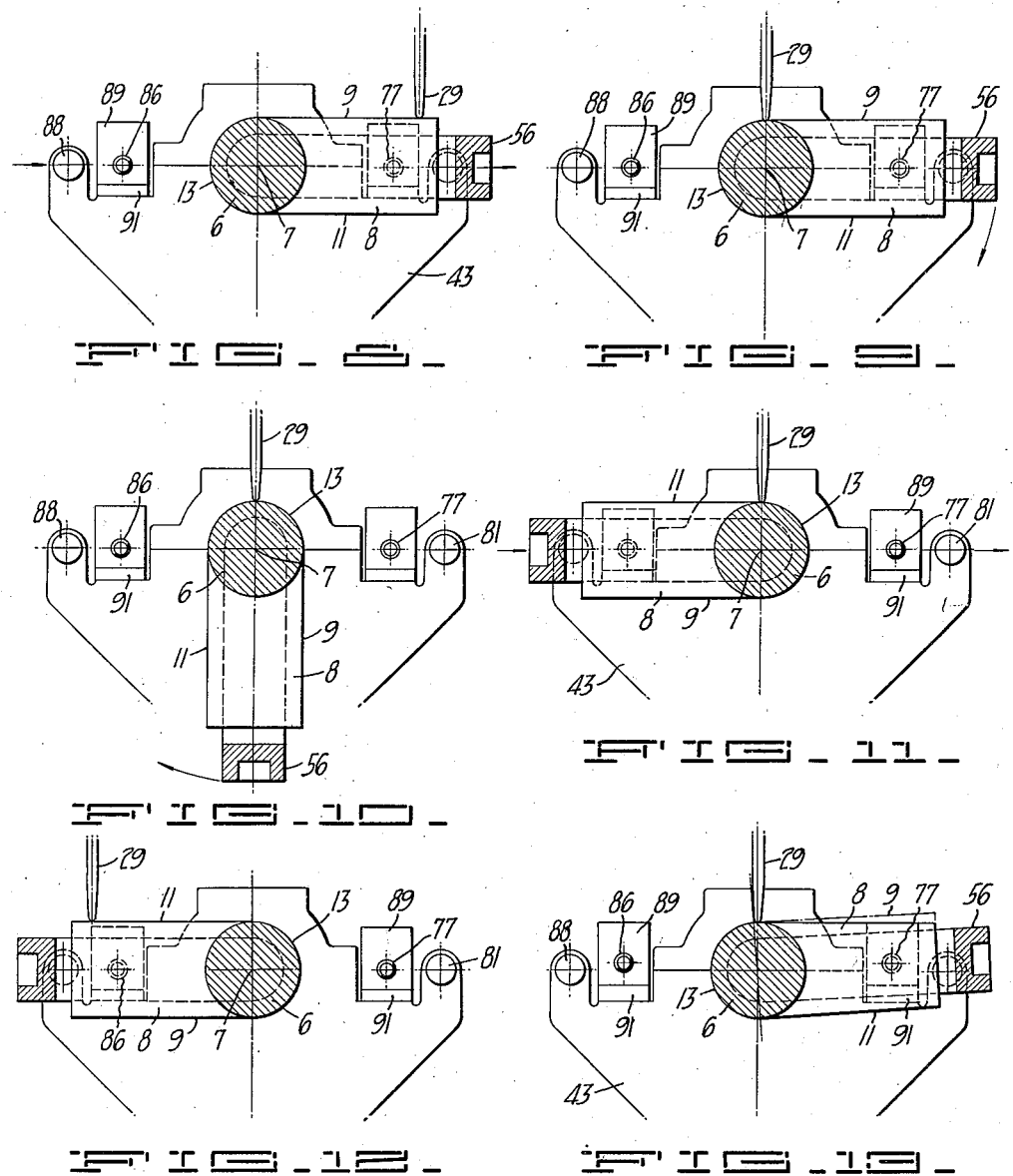

Patented Jan. 21, 1941

2,229,274

UNITED STATES PATENT OFFICE 2,229,274

MACHINE FOR FORMING BUCKET PINS

John B. Bubb, Berkeley, Calif., assignor to Yuba Manufacturing Company, San Francisco, Calif., a corporation of California Application February 19, 1938, Serial No. 191,365

7 Claims. (Cl. 90—38)

My invention relates to means for machining dredge bucket pins, particularly of the type including a circular-cylindrical pin body having at one end a pin head extending substantially at right angles to the axis of the pin body. Dredge bucket pins are utilized in bucket lines of dredges to form the articulated connection between successive buckets in the line. It is desirable to prevent the pins from turning in their mounting, and hence the standard procedure is to dispose the pin head between a pair of abutments formed integrally with the bucket so that the pin cannot rotate. The abutments on the bucket are sometimes parallel and tangent to the bucket eye within which the pin is seated, sometimes are tangent to but diverge or converge from the bucket eye, sometimes extend on both sides of the bucket eye, either in parallelism or divergence, and sometimes are various combinations of the foregoing and other arrangements. Furthermore, the abutments are not always tangent to the bucket eye, but the generally utilized construction is one in which the pin head has parallel sides tangent to an arc concentric with the axis of the pin body.

It is therefore an object of my invention to provide a machine for forming bucket pins of the general kind mentioned.

Another object of my invention is to provide a machine for forming bucket pins whereby pins of various patterns and styles can with equal facility be produced.

A further object of my invention is to improve generally the manufacturing technique, for the forming of dredge bucket pins.

An additional object of my invention is to provide a machine for forming dredge bucket pins by reason of which dredge bucket pins can be made with considerably greater accuracy and speed than has been commercially feasible in the past.

The foregoing and other objects are attained in the embodiment of the invention illustrated in the drawings, in which Fig. 1 is a side elevation of the principal portion of a pin forming machine constructed in accordance with my invention;

Fig. 2 is a front elevation of the machine shown in Fig. 1;

Fig. 3 is a cross-section substantially as indicated by the line 3—3 of Fig. 1, showing the central portion of the machine in plan.

Fig. 4 is a detail cross-section the plane of which is indicated by the line 4—4 of Fig. 3;

Fig. 5 is a cross-section the plane of which is indicated by the line 5—5 of Fig. 3;

Fig. 6 is a detail showing in side elevation comparable to Fig. 1, part of the tail stock of the machine, with portions in cross-section on a median plane;

Fig. 7 is a cross-section the plane of which is indicated by the line 7—7 of Fig. 3;

Figs. 8 to 12 inclusive show in diagrammatic front elevation progressive stages in the formation of bucket pins in accordance with my invention; and Fig. 13 is a diagrammatic front elevation comparable to Figs. 8 to 12, inclusive, but showing the formation of a bucket pin in accordance with my invention wherein the sides of the bucket pin are tapered rather than parallel.

A bucket pin of the customary kind is illustrated in Figs. 1 and 5, which show the pin to include a circular-cylindrical body 6 symmetrical about a central axis 7. At one end of the body 6 there extends a head 8 which projects substantially at right angles to the axis 7 and in most instances has a rectangular cross-section. The head is bounded by a pair of sides 9 and 11 which in the illustrated instance are parallel and are tangent to an arc 13 which is concentric with the axis 7 and is in effect a continuation of the circular-cylindrical surface of the body 6. The pin head terminates in an end surface 14 which is usually not finished inasmuch as it takes no part in the operation of the pin when mounted in a bucket. The remainder of the pin head is bounded by an inner face 16 which usually is machined, although sometimes is not, and an outer face 17 which usually is not formed with great accuracy. The present invention has primarily to do with the formation and finishing of the arcuate surface 13 and the tangential, or nearly tangential, sides 9 and 11.

In the present instance I have preferred to embody my invention by alterations to and additions on a standard, commercially available shaper 26; therefore the standard portions of the shaper are not illustrated or described in detail. The device, however, includes a frame 27 upon which a ram 28 is mounted. The ram 28 reciprocates with an amplitude which can be adjusted in accordance with usual practice, and at its forward end carries a cutting tool 29 mounted in a holder 31 which can be rotated about an axis passing through the center thereof and which can likewise be raised or lowered by manipulation of a regulating hand-wheel 32. The tool 29 can therefore be reciprocated at any desired elevation in the machine, can be inclined at any selected angle, and can have a path of any selected amplitude. The forward portion of the base 27 is provided with vertical ways 33 on which a body 34 is vertically movable by manipulation of a screw-jack 36. The body 34 is supplemented by an auxiliary body 37 which also engages the ways 33 and is accurately aligned with respect to the main body 34 by adjusting jacks 38 located between side projections of the main and auxiliary bodies.

The main and auxiliary bodies are formed to provide a plurality of parallel transverse ways 38 and 39, serving as guides for a transversely movable bed, generally designated 41, which is preferably comprised of a lower portion 42 and an upper portion 43 fastened together for rectilinear translation in unison. The lower portion 42 has an extension 44 at its remote end carried on adjustable supports 46 slidable upon a transverse way 47 on the frame 27.

In order that the bed 41 can be translated in either direction on the bodies 34 and 37, there is provided a transverse feed screw 48 connected releasably to the power driving mechanism of the machine under the control of a clutch lever 49 for effecting engagement and disengagement, as well as reversal, of the transverse feed. By suitably manipulating the lever 49 the operator is enabled to translate the beds 42 and 43 in unison transversely of the machine.

In its central portion the bed 43 is provided with a hub 51 which is rotatable through a worm wheel and gear by a feed shaft 52 extending transversely of the machine to a driving head 53 connected to the source of power on the machine. The shaft 52 is operated under the control of a lever 54, so that upon suitable manipulation of the lever the drive of the hub 51 can be disconnected from the machine or can be effected in either direction of rotation.

Carried by the hub 51 is a bucket pin holding fixture or jig 56 which includes a boss 57 projecting into and rotatable in conjunction with the hub 51 and which carries on the axis of rotation 7 a center 58. Projecting from the hub 57 is a U-shaped frame 59 having therein set-screws 61 and 62 for engagement respectively with the outer face 17 and with the inner face 16 of the bucket pin. On the jig 56 are adjustable and removable side plates 63, which carry set-screws 64 for engagement with the corners of the pin head in order to prevent it from rotating when mounted in the fixture 56.

In order to assist the fixture in locating the axis of the bucket pin in coincidence with the axis of rotation, a tail stock 66 is provided. The remote end of the bucket pin is in engagement with a live center 67 mounted in a carriage 68 which is slidable upon a base 69 in response to the manipulations of a hand-wheel 71. The base 69 is secured in any suitable location on the extension 44 by means of hold-down bolts 72.

With the bucket pin 6 mounted as described, it is rotatable about the axis 7 by turning with the live center 67 and with the hub 57. The bucket pin 6 rotates in unison with the jig 56 since it is held rigidly with respect thereto by the various set-screws 61, 62 and 64. In addition, the bucket pin is translatable transversely of the machine together with the bed 41, so that the pin is not only translatable in both directions but is likewise rotatable with respect to the tool 29.

There is preferably provided means for holding the bucket pin against rotation while it is being translated in either direction, and, as shown particularly in Fig. 3, there is provided on the jig 56 a bored boss 76 into which a locating pin 77 is movable by operation of a hand-crank 78. In order to relieve the pin 77 of strain and additionally to hold the jig, there is likewise provided on the jig 56 an undercut arcuate channel 79 with which a headed bolt 81 is engageable. The bolt 82 passes through a boss 82 on the upper bed 43 and can be tightened by manipulation of a nut 83, so that while the jig 56 is located by the pin 77 it is rigidly held in located position by the tightened bolt 81. The force exerted on the bucket pin by the cutting tool is thus directly transmitted to and entirely resisted by the bed 43 supported on the main base 26 by the ways 39, so that substantially none of this force is resisted through the tail stock. The tail stock acts primarily as a locating means so that accuracy is maintained for a long period of time.

On the other side of the upper bed 43 there is provided a comparable locating pin 86 which is projectable and retractable by suitable manipulation of a hand crank 87, and there is also provided a headed bolt 88 which may be tightened by manipulation of a nut 90 to clamp the fixture 56 rigidly in position when it is rotated 180° from the location shown in Fig. 3. By these mechanisms the jig 56 can be accurately located and clamped in either of two positions, so that the bucket pin is held rigidly while being translated.

The locating pins 77 and 86 are ordinarily 180° apart on a diameter passing through the axis 7, and consequently provide for locating the bucket pin so that the sides 9 and 11 of the head can be machined in absolute parallelism. But for instances where it is desired to machine the sides so that they either converge or diverge, the pins 77 and 86 may be raised or lowered with respect to the axis 7 so that they are less than 180° apart. The height of the pin is varied by removing the blocks 89 in which they are mounted and replacing the shims 91 interposed between such blocks and the upper bed 43, with shims of greater or less thickness. Because of the slotted holes through which the block-holding bolts pass, the blocks can be slightly shifted transversely also in order that the pins 77 and 86 will occupy new positions at the same radius from the axis of rotation as their old positions. Since the channel 79 is arcuate about the axis 7 as a center, the jig 56 can be clamped in location by the bolts 81 and 88, even though it is rotated several degrees out of the horizontal position. In this way there is afforded a means for disposing the pin for machining of the side faces 9 and 11 either in absolute parallelism or with any selected degree of divergence or convergence.

In order to finish a roughly formed bucket pin in accordance with my invention, the pin is located with one end engaged with the center 67, the other end engaged with the center 58, and the pin head located and clamped in position in the jig 56 by means of the set-screws 61, 62 and 64. The jig 56 is then positioned accurately in one rotated position by turning the circular feed shaft 52 so that hub 51 is rotated to bring the pin holding fixture into position so that the pin 77 can be projected into the aperture 76, following which the bolt 79 is tightened by operation of the nut 83, so that the jig is clamped securely in position.

The feed lever 49 is manipulated so that the bed 41 is translated toward one extreme position with respect to the tool 29, as shown in Fig. 8. Then the ram 28 is started to reciprocate, the wheel 32 is operated to lower the tool 29 into engagement with the exposed side 9 of the pin, and the lever 49 is again operated to reverse the feed and slowly to translate the bed 41 to the right, as seen in Fig. 8. This rectilinear translation of the bed moves the pin 6 with respect to the tool 29, to finish a planar surface 9 on one side of the head. This movement of the bed is continued until such time as the tool 29 is on a diameter of the pin 6 or is at the point of tangency of the planar surface 9 with the arcuate surface 13.

At this point the lever 49 is put in neutral position to disengage the cross feed of the bed, the nut 83 is loosened, the crank 78 is operated to retract the locating pin 77 from the aperture 76, and the lever 54 is manipulated to engage the circular feed, so that the hub 51 is rotated. The pin 6 is thereupon rotated in unison with the jig 56 while the carriage or bed 41 is stationary, so that the arcuate surface 13 is cut by the tool 29 to coincide substantially with the circular-cylindrical body 6 of the pin. During this time the jig 56 rotates clockwise, as seen in Figs. 9 and 10, and continues until it is substantially in the position shown in Fig. 11, or at 180° to its position as shown in Fig. 8.

When the jig has arrived at the end of its rotated position, the circular feed is stopped by a suitable operation of the lever 54, and the crank 87 is rotated to project the locating pin 86 into the aperture 76, thereby precisely positioning the jig which is then clamped by tightening the nut 90 so that the headed bolt 88, which is then in engagement with the channel 79, holds the jig in its new position. Subsequently, the lever 49 is operated so that the bed 41 is translated in the opposite direction with respect to the base 27 (toward the right in Fig. 11), and return translation of the bed with respect to the tool 29 is begun.

This transverse translation continues until such time as the tool has arrived approximately in the position shown in Fig. 12 when it has machined the surface 11 of the pin in parallelism with the surface 9 and tangentially to the arcuate surface 13. At this point the ram 28 is stopped, the tool 29 is raised from the work by operating the wheel 32, the transverse feed is disengaged by operation of the lever 49, the set-screws 61, 62 and 64 are released, the tail stock carriage 66 is retracted by operation of the hand-wheel 71, and the pin is removed from the machine with its head accurately finished.

In the event the sides of the pin head 9 and 11 are to be converging, for example, rather than parallel, thicker shims 91 are utilized under the blocks 89, as illustrated in Fig. 13, so that while the tool 29 continues to cut during horizontal traverse of the bed 41, the jig 56, being several degrees out of horizontal position, holds the pin so that the sides are convergent instead of parallel. If thin shims are provided, that is, shims thinner than those used in the parallel finishing operation, then the sides 9 and 11 of the pin diverge rather than converge.

It will be appreciated that with the machine of my invention it is possible, in a single set-up of a dredge bucket pin, to provide a formation which is exceedingly accurate yet which conforms to any of the standard configurations, including parallel, convergent or divergent sides, with a high degree of accuracy of the merging arcuate and tangential or nearly tangential surfaces.

I claim:

1. A machine for forming bucket pins, comprising a jig for holding a bucket pin, a cutting tool, means for translating said jig in one direction with respect to said tool, means for locking said jig against rotation during translation in said direction, means for rotating said jig substantially through a half-circle, means for translating said jig in the opposite direction with respect to said tool, and means for locking said jig against rotation during translation in said opposite direction.

2. A machine for forming bucket pins, comprising a frame, a member translatable on said frame in a predetermined direction, a jig mounted on said member to rotate about an axis normal to said direction, means for clamping said jig to said member in selected positions of rotation on said member about said axis, and a cutting tool on said frame adapted to engage a bucket pin in said jig.

3. A machine for forming bucket pins, comprising a jig for holding a bucket pin, a cutting tool, a first means for rotatably mounting said jig to turn about an axis with respect to said tool, a second means for translatably mounting said mounting means with respect to said tool for movement in a direction at right angles to said axis, means for clamping said jig on said second means against turning about said axis, and means for operating both of said mounting means in sequence.

4. A machine for forming bucket pins, comprising a frame, a cutting tool mounted upon said frame, a jig for holding a bucket pin, means for supporting said jig for rotation about an axis on said frame, means for mounting said supporting means for translation on said frame for movement in a direction at right angles to said axis, means for clamping said jig against rotation about said axis during said translation, and means for rotating said jig and for translating said supporting means.

5. A machine for forming bucket pins, comprising a frame, a cutting tool reciprocable upon said frame, a jig for holding a bucket pin, means for rotating said jig about an axis on said frame, means for translating said jig on said frame in a direction at right angles to the direction of reciprocation of said cutting tool, and means for clamping said jig to said translating means to prevent rotation of said jig about said axis during translation thereof.

6. A machine for forming bucket pins, comprising a frame, a plurality of parallel transverse ways on said frame disposed in substantially vertical planes, a transversely movable bed mounted on all of said ways, a jig for holding a bucket pin mounted on said bed for rotation about an axis normal to said ways, and means on said bed for locking said jig against rotation about said axis.

7. A machine for forming bucket pins, comprising a frame, transverse ways on said frame, a transversely movable bed mounted on said ways, a jig for holding a bucket pin mounted on said bed for rotation about an axis normal to said ways, means on said bed for locking said jig against rotation about said axis, and means for holding said locking means in different positions toward and away from said ways.

JOHN B. BUBB.